United States Patent [19]

Amstad

[11] 4,062,985
[45] Dec. 13, 1977

[54] CONTINUOUS PEELING METHOD

[75] Inventor: John H. Amstad, Alameda, Calif.

[73] Assignee: Atlas Pacific Engineering Company, Emeryville, Calif.

[21] Appl. No.: 716,067

[22] Filed: Aug. 19, 1976

Related U.S. Application Data

[60] Division of Ser. No. 635,606, Nov. 26, 1975, which is a continuation-in-part of Ser. No. 452,420, March 18, 1974, abandoned.

[51] Int. Cl.$^2$ .............................................. A23N 7/00
[52] U.S. Cl. .................................. 426/483; 99/630; 99/634; 426/519
[58] Field of Search ..................... 426/519, 483, 482; 99/539, 593, 540, 596, 567, 623, 568, 624, 574, 575, 629, 581, 630, 584, 634, 585, 586, 587

[56] References Cited

U.S. PATENT DOCUMENTS

| | | | |
|---|---|---|---|
| 2,424,803 | 7/1947 | De Back | 99/634 |
| 3,123,114 | 3/1964 | Andrews et al. | 99/634 X |
| 3,134,413 | 5/1964 | Dorsa et al. | 99/634 X |
| 3,460,162 | 8/1969 | Sijbring | 426/483 |
| 3,734,752 | 5/1973 | Headly | 426/483 X |
| 3,790,690 | 2/1974 | Fritze | 426/482 X |
| 3,811,000 | 5/1974 | Lazzarini | 426/483 |
| 3,854,395 | 12/1974 | Hirahara | 99/630 |
| 3,946,658 | 3/1976 | Smith | 99/630 X |

OTHER PUBLICATIONS

Woodroof et al.; Commercial Fruit Processing; The Avi Pub. Co. Inc. Westport, Conn.; 1975; pp. 80, 81.

Arsdel et al.; Food Dehydration; The Avi Pub. Co., Inc., Westport, Conn.; 1973; p. 5.

Primary Examiner—S. Leon Bashore
Assistant Examiner—Kenneth M. Schor
Attorney, Agent, or Firm—Robert H. Eckhoff

[57] ABSTRACT

An apparatus and method for continuously peeling vegetables and fruits in large quantities. The apparatus includes a support structure with a housing rotatably mounted thereon, the housing having a plurality of closely spaced-apart, rotating abrading spindles mounted thereon forming an enclosed cage. Rotation of the cage at a sufficient rate accelerates produce items engaging the spindles into generally circular orbits at a speed which results in the produce items being held against the rotating spindles by centrifugal force. The centrifugal force generated by the rotation of the cage also urges peelings outwardly of the cage between the spindles for discharge. A finger drum is rotatably mounted on said support structure within the cage and has a plurality of flexible fingers thereon adapted to engage produce items as they move from a feed end to a discharge end of the housing. Rotation of the finger drum causes the fingers to urge the produce items into initial engagement with the spindles. Separate, variable speed drives are operably connected to the respective housing, spindles and finger drum whereby each is rotatable, as desired, independently of one another with selected rotational speeds.

3 Claims, 6 Drawing Figures

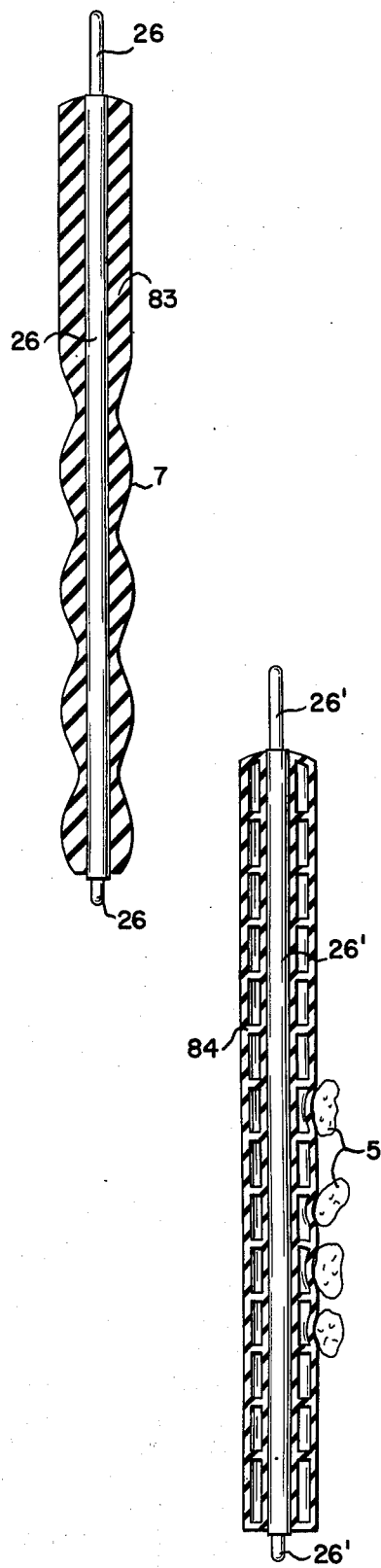
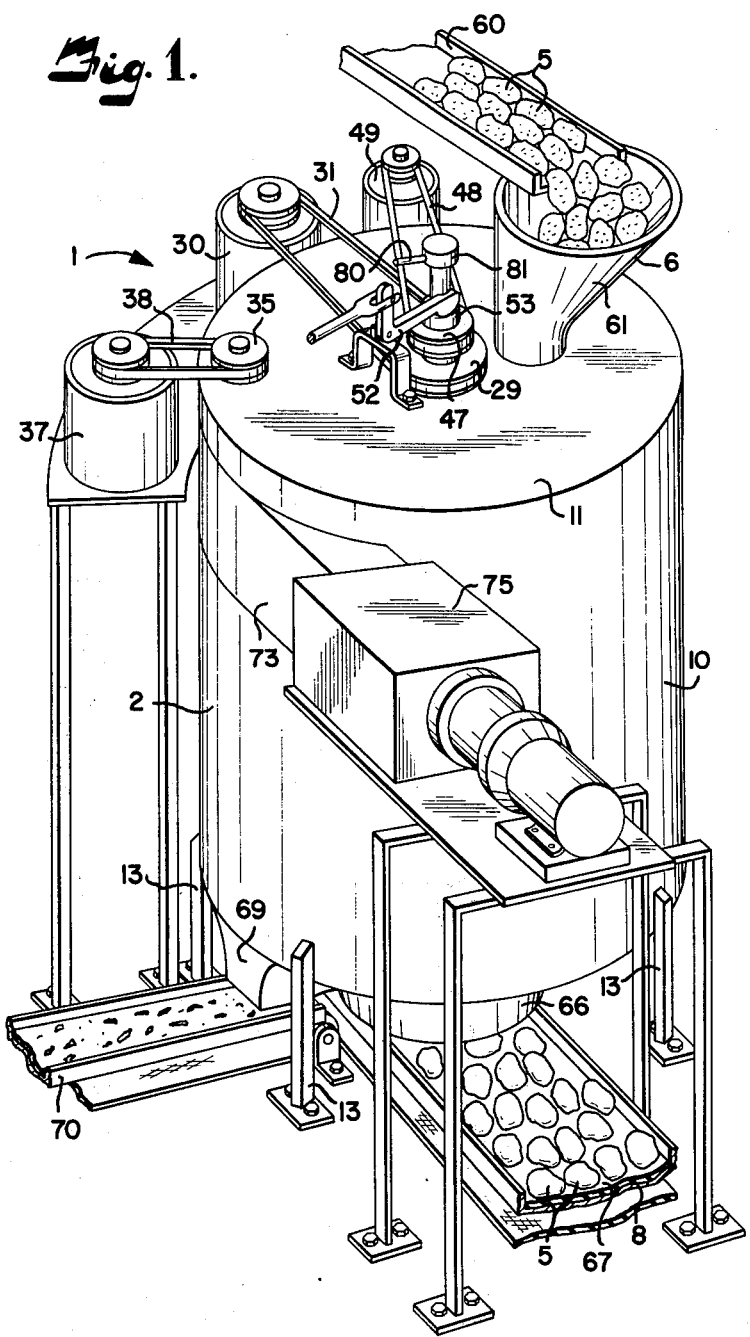

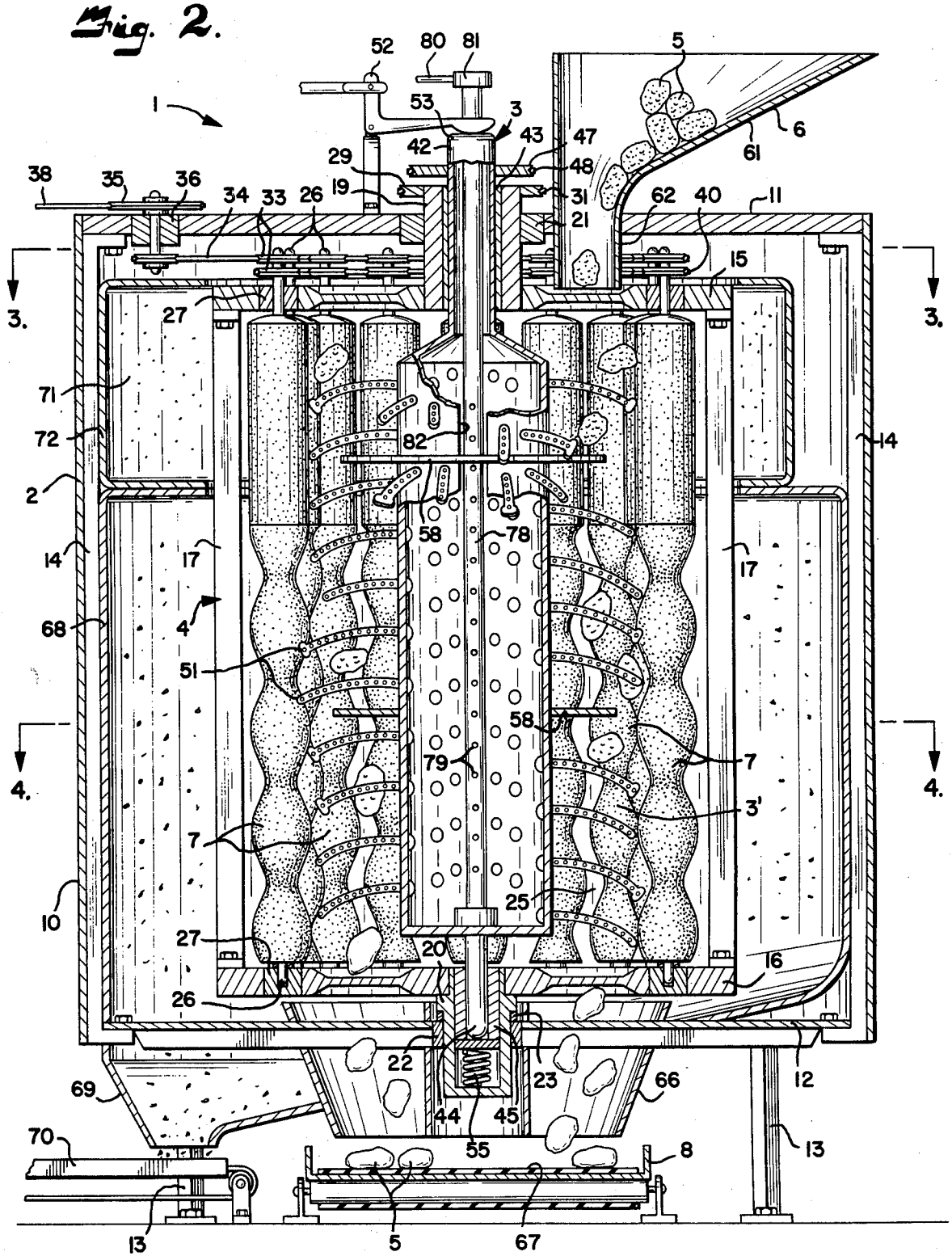

CONTINUOUS PEELING METHOD

This is a divisional application of copending application Ser. No. 635,606, filed Nov. 26, 1975, which is a continuation-in-part of application Ser. No. 452,420 filed Mar. 18, 1974, said last named application being abandoned.

Devices for peeling vegetables and fruit such as potatoes, apples, etc., are known and vary from types designed for household use to large commercial arrangements adapted for high rate mass production. The commercial arrangements have heretofore involved undesirable characteristics or requirements including a need for substantial quantities of harsh chemicals such as lye to partially degrade peelings, large amounts of wash water, for example, 500 to 2,000 gallons per ton of produce to separate out the peelings and debris, and the tendency to remove excessive amounts of produce meat with the peelings.

Further, the use of chemicals and large quantities of water to facilitate the removal of peelings creates secondary problems in that further processing is required before the removed material can be utilized, as for animal feed, and large quantities of liquid waste present disposal difficulties, particularly in view of new stringent pollution restrictions. Thus, there is a need for improved means and methods for peeling produce items in large quantities.

The principal objects of the present invention are: to provide a mass production peeling apparatus and method which reduces or eliminates the above mentioned difficulties; to provide such a peeling apparatus which permits a continuous flow of produce items therethrough for peeling at a high rate; to provide such peeling arrangement which is adapted for removing debris such as dirt and the like in the same apparatus which removes a minimum of usable produce meat with the dirt and peelings; to provide such an apparatus and method adapted to be used without or with minimal wash water to separate the removed peelings; to provide such an apparatus which is adjustable to control the rate of movement of the produce through the apparatus and hence the amount of meat removed with the peelings and also control the output rate of the peeler; to provide such an apparatus which substantially reduces or eliminates the need for chemically treating the peelings before removing same from the produce; to provide such an apparatus wherein the removed peelings are usable for livestock feed and the like without further processing; and to provide such an apparatus which is well adapted for its intended purpose, relatively simple in construction, positive in function and economical in operation.

Other objects and advantages of the invention will become apparent from the following detailed description taken in connection with the accompanying drawings wherein are set forth by way of illustration and example certain embodiments of the present invention.

FIG. 1 is a perspective view of a peeling apparatus embodying this invention.

FIG. 2 is a vertical, cross-sectional view through the peeling apparatus taken on the line 2—2, FIG. 3, showing internal details thereof.

FIG. 5 is a vertical, cross-sectional view of one of the apparatus spindles.

FIG. 6 is a vertical, cross-sectional view showing a modified form of one of the apparatus spindles.

Figure 3:
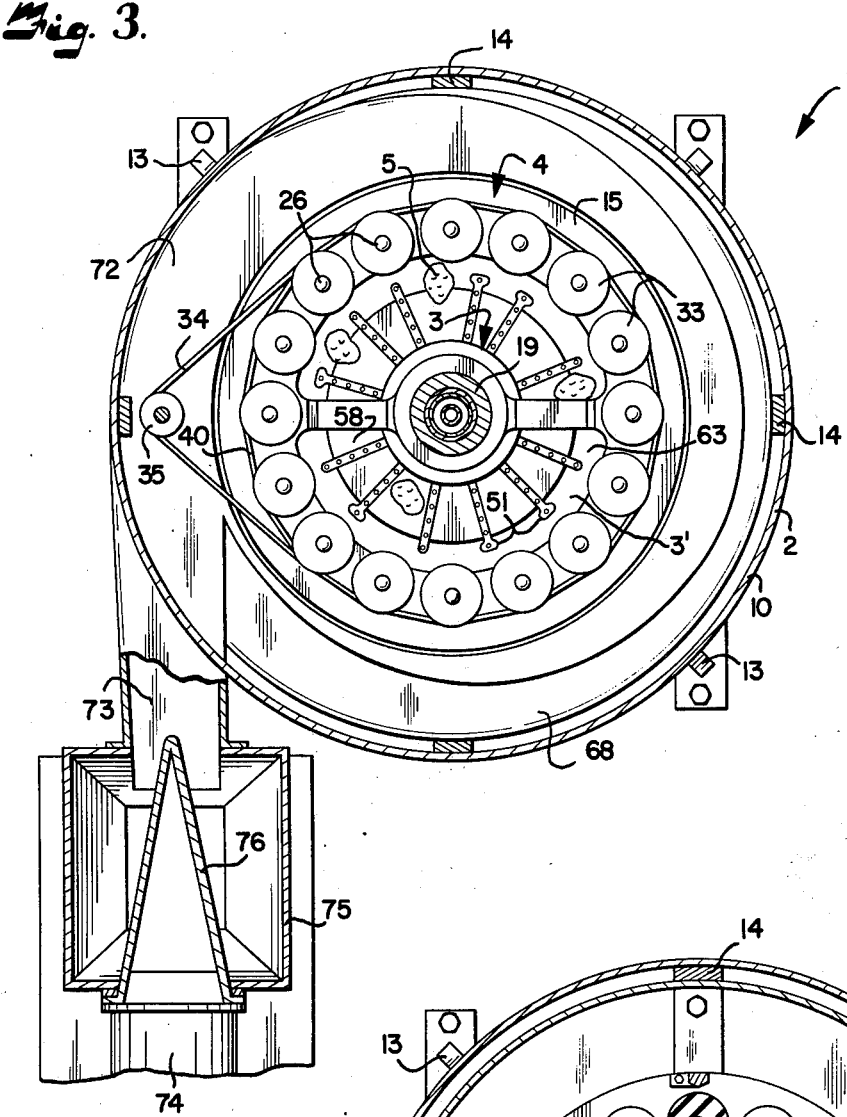
FIG. 3 is a horizontal, cross-sectional view through the peeling apparatus taken on the line 3—3, FIG. 2.
Figure 4:
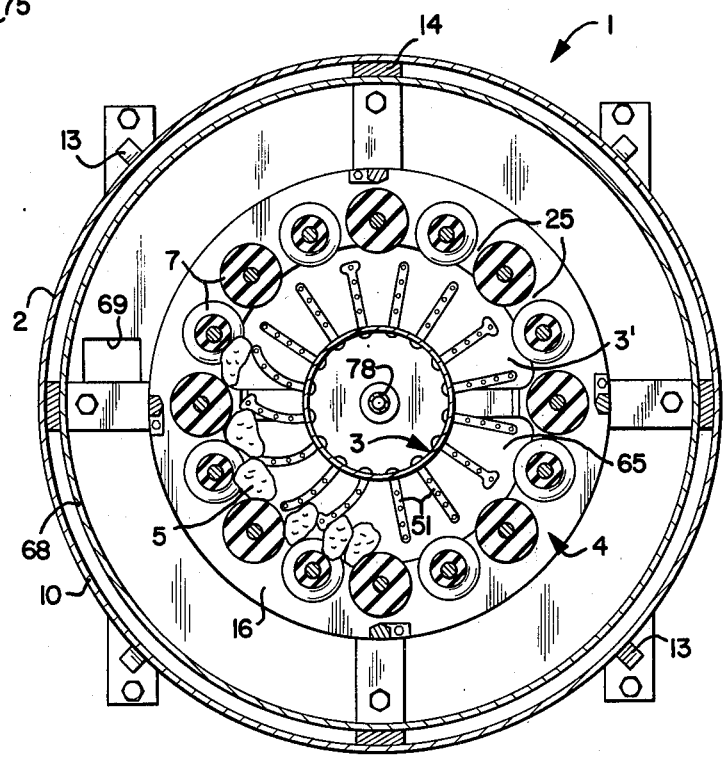
FIG. 4 is a horizontal cross-sectional view through the peeling apparatus taken along the lien 4—4, FIG. 2.

Referring more in detail to the drawings:

The reference numeral 1 designates generally an apparatus for peeling and cleaning vegetables or fruit such as potatoes, apples, etc., referred to generally as "vegetables" or "produce", continuously at high production rates. The apparatus 1 includes a support structure or housing 2 having therein rotating shaft means 3 rotable in a chamber 3' in the interior of a rotating cage or housing 4. Vegetables 5 are fed by feed chute means 6 into the cage 4 and move, in this example, over a comples path from an upper feed end to a lower discharge end during which the vegetables 5 are maintained by cage generated centrifugal force in engagement with rotating abrasive spindles or members 7 which at least partially define the rotating cage 4. The peelings are thereby removed and directed radially outwardly of the cage 4 between the spindles 7, also by the cage generated centrifugal force. After peeling, the vegetables 5 are discharged from the lower end of the cage 4 where they may be transported away for further processing, as by conveying means 8.

The support structure or housing 2 includes an enclosure defined by a cylindrical side wall 10 and upper and lower end walls 11 and 12 secured together by structural members 14. Leg members 13 are secured to portions of the side wall 10 for supporting the housing 2 above a floor or deck. In the illustrated structure, the case 4 is suitably mounted within the housing 2 for rotation about a vertical axis. The cage 4 includes upper and lower end members 15 and 16 secured in spaced-apart relation by structural members 17. The upper and lower end members 15 and 16 are respectively provided with axles 19 and 20, each receivable in a respective journal bearing 21 and 22 secured to housing end walls 11 and 12. The weight of the cage 4 is primarily carried by lower thrust bearing 23.

The abrasive spindles 7 are located and shaped so as to expose abrasive surface portions to produce within the cage 4. The abrasive spindles 7 have axes generally parallel to the axis of the cage 4 and are here illustrated indpendently rotatably mounted on the cage 4 by shaft portions 26 on opposite ends received in bearing members 27 which are suitably secured to respective cage end members 15 and 16. The spindles 7 are circumferentially positioned in parallel relation about the cage 4 and located in spaced relation to each other so as to form discharge openings 25 therebetween which, in this example, are radial of the axes of the cage 4 and shaft means 3. As shown in FIGS. 2 and 5, the upper portions of the spindles 7 are substantially cylindrical and the central and lower portions have undulating diametral portions tending to increase the surface area between same and the vegetables being peeled. Preferably, the major portions of the undulations of one spindle are positioned to be received in the minor portions of the undulations in the two adjacent spindles to provide generally constant spacing width for the openings 25.

Power drive means are operably connected to the spindles 7 and the cage 4 for effecting rotation thereof. In the illustrated form a drive member such as a pulley 29 is secured to the axle 19 and is operably connected to a variable speed motor 30 by a belt 31 wherein the motor 30 effects the rotation of the cage 4. As illustrated, each of the spindles 7 has a pair of drive members such as pulleys 33 secured thereto and periodically engaged with a belt 34 which in turn is engaged with a drive arrangement 35 rotatably mounted in a top wall bearing member 36. Suitable power means 37, such as a variable speed motor is operably connected to the arrangement 35 by a belt 38. As best seen in FIG. 3, certain of the spindles 7 are not in driving engagement with the belt 34. In order to maintain the spindles 7 all rotating together, the lower disposed pulleys 33 are all operably connected by a belt 40 to form a suitable slave drive unit.

The shaft means 3 in the illustrated structure is rotatably mounted in the cage 4 and coaxial therewith. As illustrated, shaft means 3 has a hollow shaft portion 42 rotatably received in a bearing 43 which is secured in the axle 19. The lower portion of the shaft means 3 has a shaft 44 projecting therefrom and rotatably received in a bearing 45 which is secured in the axle 20. Power operated drive means such as a variable speed motor 49 is operably connected to the shaft means 3 for rotating same independently of the cage 4. As illustrated, a pulley 47 or other suitable drive member is secured to the shaft portion 42 and engages a flexible drive member such as a belt 48, operably connecting same to the motor 49.

The shaft means 3 is provided with members for engaging vegetables and urging them into contact with the spindles 7. Although many variations of shape are possible, in this example the vegetable engaging members comprise elongated, spaced, flexible fingers 51 which are secured to and extend generally radially outwardly from the shaft means 3. The fingers 51 need not be uniform in configuration, stiffness or surface finish and they may be provided with an abrasive surface to facilitate removal of the peelings from the produce or vegetables 5. The fingers 51 terminate in free ends contacting, or closely spaced from, the spindles 7 so engagement can be made with the vegetables contacting the spindles to help keep the produce in a state of complex relative movement with all contacting surfaces. Thus the motor 37 rotates the spindles 7 to expose the vegetables to relative abrasive spindle surface movement and the fingers 51 provide additional relatively movable elements contacting the vegetables 5.

Further, in this example, means are provided for inducing compound motion in the shaft means 3. To this end, oscillating longitudinal movement of the shaft means 3 is produced by an actuating member 52 engaging an upper disposed end 53 of the shaft 42. The actuating member 52 is pivotally mounted on a bracket 54 and connected to a power driven cam actuating member (not shown). The shaft 44 is in engagement with a compression spring 55 which partially absorbs energy from the downward longitudinal displacement of the shaft means 3 and helps return same to an up position.

It is preferred that means be provided to control the dwell time or the time the vegetable 5 require to travel through the cage 4. In this regard a plurality of spaced-apart discs 58 are secured to and extend outwardly from the shaft means 3 and tend to impede the motion of the vegetables 5 through the cage 4. In the form shown, the peripheral edge of the discs 58 is spaced from the spindles 7 a suitable distance to allow the vegetables to pass closely therebetween.

A conveyor 60 of any suitable type conveys the vegetables 5 to a hopper 61 which has a discharge member 62 positioned for directing the vegetables into the cage 4. The upper end member 15 of the cage 4 is provided with openings 63, allowing the vegetables to enter. The lower end member 16 of the cage 4 has openings 65 therethrough positioned over a discharge spout 66, whereby peeled vegetables are directed onto a conveyor 67 for transport to an area away from the apparatus 1 for further processing, if desired. A separate housing 68 is located within the support housing 2 and forms a chamber around the exterior of the lower portion of the cage 4 so that peelings that are directed through the discharge openings 25 by centrifugal force induced by the rotation of the cage 4 are collected and discharged through a spout 69 onto a suitable conveyor 70.

In processing vegetables, generally it is found that a certain amount of debris such as dirt and the like is located thereon and it is desirable to remove same without having to utilize a prewash. In this regard the vegetables 5 pass through a scrubber portion 71 positioned in the upper end of the cage 4 and wherein the spindles 7 remove such debris from the vegetable surface. Means are provided to collect the debris and keep same separate from the peelings collected in the housing 68. As illustrated, this structure includes a housing 72 surrounding the upper portion of the cage 4 and having an air evacuation device which helps induce the debris from the cage 4 and into the surrounding housing 72. In this example, a duct 73 opens into the housing 72 and has a suction blower or fan 74 connected thereto to create a vacuum in the housing 72. A collector 75 is connected between the fan 74 and the duct 73 and includes a filter 76 therein which allows the air to flow therethrough and into the fan while retaining the debris for later removal.

In the illustrated structure, means are provided for injecting a fluid into the interior of the cage 4 for cleaning same or spraying a preservative on the vegetables and the peelings during the peeling operation. A manifold 78 is mounted in the interior of the shaft means and has a plurality of spray openings 79 along the length thereof with the lower end of the manifold 78 suitably held in position adjacent the lower end of the shaft means 3. The manifold 78 is connected to a suitable supply of fluid such as water or preservative by a conduit 80 which in turn is connected thereto by a rotary union 81 fed by suitable means (not shown). This permits rotation of the mainfold 78 with the shaft means 3 or independently thereof. The fluid is sprayed through an elongated slot or opening 82 extending through the wall of the member 3.

The spindles 7 may take various shapes and characteristics, however, one form is seen in FIG. 5 wherein the shaft 26 extends the length thereof with a skin or covering 83 thereon. The skin 83, for example, may be resilient and deformable under the pressure of vegetables in centrifugal-force engagement therewith to better conform to the shape thereof. FIG. 6 shows a modified form of spindle having a shaft 26' extending the length thereof surrounded by a resilient sleeve 84, such as rubber, with hollow interior portions extending therearound. Further modifications such as various opposed or random depressions and protrusions on spindle surfaces may be utilized to help maintain continuous relative produce turning and motion. Also, certain of the spindles may be advantageously held stationary or rotated at different speeds.

In operation, produce or vegetables 5, such as potatoes to be peeled, are conveyed to the hopper 61 from which they are discharged through the openings 63 into the upper disposed portion or scrubber 71 of the cage 4.

The speed rotation of the shaft means 3, the cage 4 and the spindles are preselected and can be in the same direction, reverse directions or in any combination thereof. Preferred operating parameters are: shaft means 3 rotation approximately 0–500 r.p.m., cage 4 rotation approximately 120–1,000 r.p.m. and spindle rotation approximately 600–3,000 r.p.m. The lower speed of the cage 4 is limited to that required to maintain the vegetables with sufficient peeling pressure against the spindles 7 by centrifugal force generated by cage rotation.

As the vegetables 5 pass through the scrubber 71 dirt and debris are abraded from the surface thereof and evacuated into the duct 73 and collected in the collector 75. The spindles 7 and fingers 51 can be of reselected types with different abrasive means, stiffness, etc. depending on the type of vegetables to be peeled and the amount of peeling to be removed. The rotation of the shaft means 3 subjects the vegetables 5 to engagement with the fingers 51, urging them into initial engagement with the spindles 7 whereupon they are accelerated by the rotating cage, as noted, for maintaining contact against the spinning spindles for debris removal. The centrifugal force generated by the rotating cage further induces the debris to be discharged into the surrounding portion of the housing 72.

Downward movement of the vegetables 5 through the cage 4 brings them into engagement with the undulating diametral portions of the spindles 7 where the abrasive relative engagement, produced by the spinning spindles under said centrifugal force, abrades away the peelings from the vegetables 5 and the same centrifugal force separates the removed peelings and propels them between the spindles and into the housing 68 for collection and discharge.

As described above, the fingers 51 can be provided with an abrasive surface to facilitate the debris and peel removal and also to help insure complex relative turning of the vegetables as they are urged against the spindles by centrifugal force induced by cage rotation, so the entire surface of the produce item tends to be exposed to peeling contact uniformly. Longitudinal oscillation of the shaft means 3 helps control the flow rate of the vegetables 5 downwardly through the cage 4 and further induces compound rotary motion in the vegetables 5.

Upon reaching the lower portion of the cage 4 the vegetables 5 pass through the openings 65 and fall through the discharge chute 66 onto the conveyor 67 to be conducted to other processing areas, if desired. The peelings entering the housing 68 are directed through the discharge member 69 and onto the conveyor 70 for removal to areas where same can be converted into usable produced such as animal feed.

It is to be noted that the described structure eliminates or greatly reduces the need for using separating water or other liquid in the peeling process. If liquid injection is desired, it may be introduced as described above. It should be noted also that although the apparatus 1 is illustrated as being of the type where the vegetables move vertically, it can also be designed for use disposed in a generally horizontal or tilted attitude by utilizing the fingers 51 to induce movement of the vegetables in an axial direction, as by spiral positioning.

It is to be still further understood that while certain forms of this invention have been illustrated and described, it is not to be limited thereto except insofar as such limitations are included in the following claims.

What is claimed and desired to secure by letters patent is:

1. A method of peeling vegetables and separating the peelings from the resultant mixture of vegetables and peelings comprising the steps of:
   a. rotating a peeling cage formed of rotating spindles with an abrading surface having sufficient abrading properties to peel vegetables, said rotation being at a rotary speed sufficient to maintain vegetables in continuous centrifugal force contact against said spindle abrading surface wherein said vegetables travel substantially at said speed in contact with said spindle abrading surface,
   b. urging vegetables to be peeled into engagement with said spindle abrading surface,
   c. permitting said cage to accelerate said vegetables to be peeled to said speed, and
   d. separating peelings generated in said peeling cage from the vegetables by centrifugal force.

2. The method as set forth in claim 1 including the steps of:
   a. removing debris from said vegetables prior to peeling; and
   b. separating the removed debris from the vegetables at least partially by said centrifugal force and separately from said peeling separation.

3. The method as set forth in claim 2 including the steps of:
   a. partially separating the removed debris from the vegetables by air suction.

* * * * *